US011111646B2

(12) United States Patent
Lewis

(10) Patent No.: US 11,111,646 B2
(45) Date of Patent: Sep. 7, 2021

(54) SYSTEM AND METHOD FOR CONTROLLING AN ARM OF A WORK VEHICLE

(71) Applicant: CNH Industrial America LLC, New Holland, PA (US)

(72) Inventor: Brady Dorr Lewis, Peck, KS (US)

(73) Assignee: CNH Industrial America LLC

( * ) Notice: Subject to any disclaimer, the term of this patent is extended or adjusted under 35 U.S.C. 154(b) by 546 days.

(21) Appl. No.: 15/442,031

(22) Filed: Feb. 24, 2017

(65) Prior Publication Data

US 2018/0245306 A1 Aug. 30, 2018

(51) Int. Cl.

| | |
|---|---|
| ***E02F 3/34*** | (2006.01) |
| ***E02F 3/43*** | (2006.01) |
| ***G06F 19/00*** | (2018.01) |
| ***E02F 3/76*** | (2006.01) |
| ***E02F 9/20*** | (2006.01) |
| ***E02F 9/26*** | (2006.01) |
| ***E02F 3/96*** | (2006.01) |

(52) U.S. Cl.

CPC ............ *E02F 3/3414* (2013.01); *E02F 3/431* (2013.01); *E02F 3/7622* (2013.01); *E02F 3/96* (2013.01); *E02F 9/2033* (2013.01); *E02F 9/265* (2013.01); *G06F 19/00* (2013.01)

(58) Field of Classification Search

CPC ..... E02F 9/2029; E02F 9/2033; E02F 9/2041; E02F 9/2045; E02F 3/437; E02F 9/265; G01B 11/00

USPC ................................................ 701/50, 55–56

See application file for complete search history.

(56) References Cited

U.S. PATENT DOCUMENTS

| | | | | |
|---|---|---|---|---|
| 5,769,168 A | | 6/1998 | Skiba | |
| 6,115,660 A | * | 9/2000 | Berger .................... | E02F 3/432 701/50 |
| 6,129,158 A | | 10/2000 | Yamamoto et al. | |
| 6,233,511 B1 | * | 5/2001 | Berger .................... | E02F 3/432 414/699 |
| 6,997,667 B2 | | 2/2006 | Hackett et al. | |
| 7,546,729 B2 | | 6/2009 | Palmer et al. | |
| 7,881,845 B2 | | 2/2011 | Nichols | |
| 8,091,256 B2 | | 1/2012 | Piekutowski et al. | |
| 8,244,438 B2 | | 8/2012 | Koch et al. | |

(Continued)

OTHER PUBLICATIONS

John Deere, "Construstion Equipment: Attachment & Custom Engineering Guide," 15th Edition, 2001, 41 pgs.

(Continued)

*Primary Examiner* — Cuong H Nguyen

(74) *Attorney, Agent, or Firm* — Peter Zacharias; Patrick Sheldrake; Fletcher Yoder, P.C.

(57) ABSTRACT

An arm control system for a work vehicle includes a controller having a memory and a processor. The controller is configured to receive a signal indicative of a type of implement coupled to an arm of the work vehicle. The controller is also configured to enable movement of the arm between a lowered position and a raised position while the type of implement is an unrestricted-height implement. In addition, the controller is configured to enable movement of the arm between the lowered position and an intermediate position and to block upward movement of the arm beyond the intermediate position while the type of implement is a restricted-height implement.

20 Claims, 5 Drawing Sheets

(56) References Cited

U.S. PATENT DOCUMENTS

| | | | | |
|---|---|---|---|---|
| 8,428,833 | B2 * | 4/2013 | Toda | E02F 9/2246 701/50 |
| 8,473,166 | B2 | 6/2013 | Zhdanov et al. | |
| 8,483,916 | B2 | 7/2013 | Peterson et al. | |
| 8,594,879 | B2 | 11/2013 | Roberge et al. | |
| 8,606,471 | B2 | 12/2013 | Filla et al. | |
| 8,634,991 | B2 | 1/2014 | Douglas | |
| 8,738,242 | B2 | 5/2014 | Konno et al. | |
| 8,770,307 | B2 | 7/2014 | Hayashi et al. | |
| 8,807,910 | B1 | 8/2014 | Roden et al. | |
| 8,915,308 | B2 | 12/2014 | Joergensen et al. | |
| 8,924,095 | B2 | 12/2014 | Fehr et al. | |
| 9,822,507 | B2 * | 11/2017 | Singh | E02F 9/2029 |
| 2005/0034336 | A1 * | 2/2005 | Takemura | E02F 9/0866 37/347 |
| 2010/0324788 | A1 * | 12/2010 | Toda | E02F 9/2246 701/50 |
| 2011/0231070 | A1 * | 9/2011 | Toda | E02F 9/2246 701/50 |
| 2012/0073843 | A1 | 3/2012 | Kure | |
| 2013/0158818 | A1 | 6/2013 | Callaway | |
| 2014/0257646 | A1 | 9/2014 | Ishibashi et al. | |
| 2014/0325972 | A1 | 11/2014 | Ma et al. | |
| 2015/0176253 | A1 * | 6/2015 | Taylor | E02F 3/3414 701/50 |
| 2015/0308072 | A1 * | 10/2015 | Taylor | E02F 3/431 701/50 |
| 2015/0368080 | A1 * | 12/2015 | Dal Dosso | B66F 9/183 701/50 |
| 2015/0373545 | A1 * | 12/2015 | Miura | E02F 9/2054 726/7 |
| 2016/0069040 | A1 * | 3/2016 | Kami | E02F 3/437 701/50 |
| 2016/0069044 | A1 * | 3/2016 | Takaura | E02F 3/437 701/50 |
| 2016/0108602 | A1 * | 4/2016 | Singh | E02F 3/434 701/50 |
| 2016/0145827 | A1 * | 5/2016 | Kami | E02F 3/437 701/50 |
| 2016/0153165 | A1 * | 6/2016 | Singh | E02F 3/433 701/50 |

OTHER PUBLICATIONS

"Network Corrections for Machine Control; Network-Based Real-Time Kinematic (NRTK) Positioning Reduces or Eliminates the Communication, Integrity, and Affordability Problems Associated with Semi-Automated Guidance of Bulldozers, Excavators, and Other Equipment at Centimeter-Level Accuracy. This new Method Addresses Adequate Height Control, A Crucial Factor for Machine-Control Users." Jul. 2009, 8 pgs, GPS World 20.7, Questex Media Group, Inc.

"Kubota's New Hydraulic 6-in-1 Blade Takes Productivity to a New Level," Jul. 8, 2014, 3 pgs, Business Wire, New York.

* cited by examiner

SYSTEM AND METHOD FOR CONTROLLING AN ARM OF A WORK VEHICLE

BACKGROUND

The present disclosure relates generally to a system and method for controlling an arm of a work vehicle.

Certain work vehicles (e.g., tractors, skid steers, etc.) include a cab configured to house an operator, and a chassis configured to support the cab. The chassis is also configured to support wheels and/or tracks to facilitate movement of the work vehicle relative to a ground surface. In addition, various mechanical components of the work vehicle, such as a motor, a transmission, and a hydraulic system, among other components, may be supported by the chassis and/or disposed within an interior of the chassis. Certain work vehicles (e.g., skid steers) have an arm movably coupled to the chassis and configured to support an implement (e.g., dozer blade, grapple, etc.). For example, the arm may support a dozer blade to facilitate earth-moving operations.

BRIEF DESCRIPTION

In one embodiment, an arm control system for a work vehicle includes a controller having a memory and a processor. The controller is configured to receive a signal indicative of a type of implement coupled to an arm of the work vehicle. The control is also configured to enable movement of the arm between a lowered position and a raised position while the type of implement is an unrestricted-height implement. In addition, the controller is configured to enable movement of the arm between the lowered position and an intermediate position and to block upward movement of the arm beyond the intermediate position while the type of implement is a restricted-height implement. The arm is configured to position the unrestricted-height implement at a first height while the arm is in the raised position, the arm is configured to position the restricted-height implement at a second height while the arm is in the intermediate position, and the second height is below the first height.

In another embodiment, a method for controlling an arm of a work vehicle includes receiving, via a controller, a signal indicative of a type of implement coupled to the arm of the work vehicle. The method also includes enabling, via the controller, movement of the arm between a lowered position and a raised position while the type of implement is an unrestricted-height implement. In addition, the method includes enabling, via the controller, movement of the arm between the lowered position and an intermediate position while the type of implement is a restricted-height implement, and blocking, via the controller, upward movement of the arm beyond the intermediate position while the type of implement is the restricted-height implement. The arm is configured to position the unrestricted-height implement at a first height while the arm is in the raised position, the arm is configured to position the restricted-height implement at a second height while the arm is in the intermediate position, and the second height is below the first height.

In a further embodiment, an apparatus includes at least one non-transitory, tangible, machine-readable medium having instructions encoded thereon for execution by a processor. The instructions include instructions to receive a signal indicative of a type of implement coupled to an arm of a work vehicle. The instructions also include instructions to enable movement of the arm between a lowered position and a raised position while the type of implement is an unrestricted-height implement. In addition, the instructions include instructions to enable movement of the arm between the lowered position and an intermediate position and to block upward movement of the arm beyond the intermediate position while the type of implement is a restricted-height implement. The arm is configured to position the unrestricted-height implement at a first height while the arm is in the raised position, the arm is configured to position the restricted-height implement at a second height while the arm is in the intermediate position, and the second height is below the first height.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
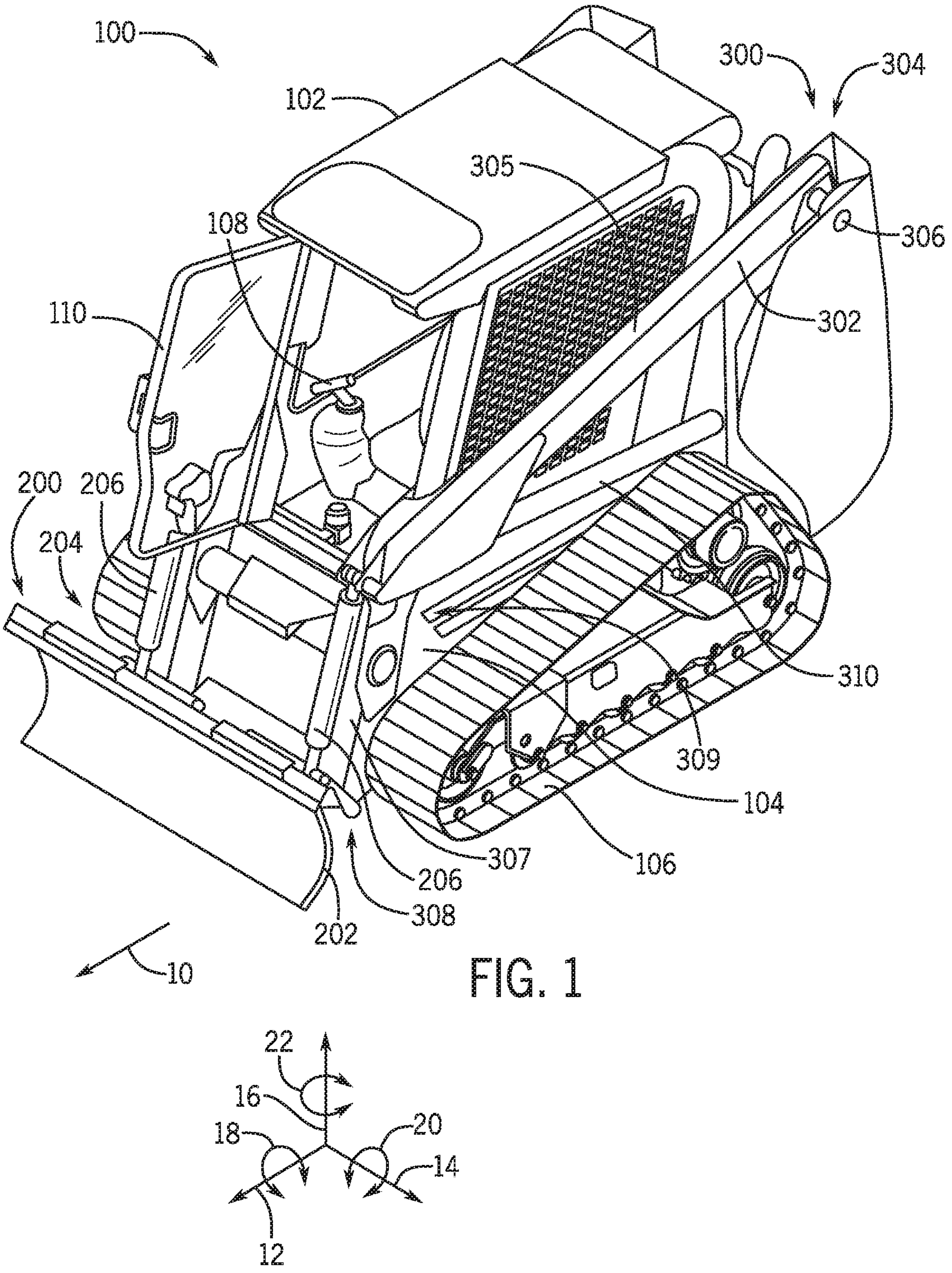
FIG. 1 is a perspective view of an embodiment of a work vehicle having an arm assembly.

FIG. 1 is a perspective view of an embodiment of a work vehicle 100 having an arm assembly. In certain embodiments, the arm assembly may be controlled by an arm control system, as discussed in detail below. In the illustrated embodiment, the work vehicle 100 is a skid steer. However, it should be appreciated that the arm control system disclosed herein may be utilized on other work vehicles, such as tractors and dozers, among other work vehicles. In the illustrated embodiment, the work vehicle 100 includes a cab 102 and a chassis 104. In certain embodiments, the chassis 104 is configured to house a motor (e.g., diesel engine, etc.), a hydraulic system (e.g., including a pump, valves, a reservoir, etc.), and other components (e.g., an electrical system, a cooling system, etc.) that facilitate operation of the work vehicle. In addition, the chassis 104 is configured to support the cab 102 and tracks 106. The tracks 106 may be driven to rotate by the motor and/or by component(s) of the hydraulic system (e.g., hydraulic motor(s), etc.). While the illustrated work vehicle 100 includes tracks 106, it should be appreciated that in alternative embodiments, the work vehicle may include wheels or a combination of wheels and tracks.

The cab 102 is configured to house an operator of the work vehicle 100. Accordingly, various controls, such as the illustrated hand controller 108, are positioned within the cab 102 to facilitate operator control of the work vehicle 100. For example, the controls may enable the operator to control the rotational speed of the tracks 106, thereby facilitating adjustment of the speed and/or the direction of the work vehicle 100. In the illustrated embodiment, the cab 102 includes a door 110 to facilitate ingress and egress of the operator from the cab 102.

In the illustrated embodiment, the work vehicle 100 includes a front implement assembly 200 having a front implement, such as the illustrated dozer blade 202. As illustrated, the dozer blade 202 is positioned forward of the chassis 104 relative to a forward direction of travel 10. In addition, the front implement assembly 200 includes a front implement actuator assembly 204 to control a position of the dozer blade 202 relative to the chassis 104. In the illustrated embodiment, the front implement actuator assembly 204 includes hydraulic cylinders 206 configured to move the dozer blade 202 relative to the chassis 104. In addition, the front implement actuator assembly may include a valve assembly configured to control hydraulic fluid flow to the hydraulic cylinders, thereby controlling the position and/or orientation of the dozer blade. In certain embodiments, the front implement actuator assembly 204 may be configured to move the dozer blade 202 along a longitudinal axis 12 of the work vehicle 100, along a lateral axis 14 of the work vehicle 100, along a vertical axis 16 of the work vehicle 100, or a combination thereof. In addition, the front implement actuator assembly 204 may be configured to rotate the dozer blade 202 about the longitudinal axis 12 in roll 18, about the lateral axis 14 in pitch 20, about the vertical axis 16 in yaw 22, or a combination thereof. While the front implement assembly includes a dozer blade in the illustrated embodiment, it should be appreciated that in alternative embodiments, the front implement assembly may include other suitable type(s) of implement(s) (e.g., a bucket, a broom, an auger, a grapple, etc.). In addition, while the front implement actuator assembly includes hydraulic cylinders in the illustrated embodiment, it should be appreciated that in alternative embodiments, the front implement actuator assembly may include other suitable type(s) of actuator(s), such as hydraulic motor (s), pneumatic actuator(s), or electromechanical actuator(s), among others.

In the illustrated embodiment, the work vehicle 100 includes an arm assembly 300 configured to support the implement assembly 200. The arm assembly 300 includes an arm 302 rotatably coupled to the chassis 104 of the work vehicle 100. As illustrated, a first end 304 of the arm 302 is rotatably coupled to the chassis 104 at pivot joints 306, and a second end 308 of the arm 302 is coupled to the implement assembly 200. In the illustrated embodiment, the arm 302 includes a substantially horizontal portion 305, a substantially vertical portion 307, and a transition portion 309 between the substantially horizontal portion 305 and the substantially vertical portion 307. The first end 304 is positioned on the substantially horizontal portion 305 of the arm 302, and the second end 308 is positioned on the substantially vertical portion 307 of the arm 302. Accordingly, the implement assembly 200 is coupled to the substantially vertical portion 307 of the arm 302. As used herein, substantially horizontal refers to an angle of the arm portion relative to the longitudinal axis 12 of less than 45 degrees, less than 40 degrees, less than 35 degrees, less than 30 degrees, less than 25 degrees, less than 20 degrees, less than 15 degrees, or less than 10 degrees while the arm is in the illustrated lowered position. In addition, as used herein, substantially vertical refers to an angle of the arm portion relative to the vertical axis 16 of less than 45 degrees, less than 40 degrees, less than 35 degrees, less than 30 degrees, less than 25 degrees, less than 20 degrees, less than 15 degrees, or less than 10 degrees while the arm is in the illustrated lowered position.

The arm assembly 300 also includes lift cylinders 310 (e.g., lift actuators) coupled to the arm 302 and to the chassis 104. The lift cylinders 310 are configured to rotate the arm 302 relative to the chassis 104 to control a position of the implement assembly 200 (e.g., the dozer blade 202 of the implement assembly 200) along the vertical axis 16. While the illustrated arm assembly 300 is configured to include two lift cylinders 310 (e.g., one on each lateral side of the work vehicle), it should be appreciated that in alternative embodiments, the arm assembly may include any suitable number of lift cylinders, such as 1, 2, 3, 4, 5, 6, or more. Furthermore, while the illustrated embodiment utilizes lift cylinder (s) (e.g., hydraulic lift cylinders), it should be appreciated that in alternative embodiments, the arm assembly may include other lift actuator(s) (e.g., electromechanical linear actuator(s), pneumatic actuator(s), hydraulic motor(s), etc.) to control the position of the arm (e.g., instead of the lift cylinder(s) or in addition to the lift cylinder(s)).

As discussed in detail below, movement of the arm 302 is controlled by an arm control system. In certain embodiments, the arm control system includes a controller configured to receive a signal (e.g., from a user interface, from a communication interface, etc.) indicative of a type of implement coupled to the arm 302. While the type of implement is an unrestricted-height implement (e.g., a bucket, a grapple, etc.), the controller is configured to enable movement of the arm 302 between a lowered position and a raised position. In addition, while the type of implement is a restricted-height implement (e.g., a dozer blade, a ground-engaging tool, etc.), the controller is configured to enable movement of the arm 302 between the lowered position and an intermediate position and to block upward movement of the arm beyond the intermediate position.

Blocking upward movement of the arm beyond the intermediate position may enable the maximum horizontal load rating of the arm/arm assembly to be increased while a restricted-height implement is coupled to the arm. For example, certain arms/arm assemblies may be configured to support a first horizontal load while the arm is in a first position and a second horizontal load, different from the first horizontal load, while the arm is in a second position. Indeed, the arm/arm assembly may be configured to support varying horizontal loads based on the position of the arm. For example, the arm/arm assembly may be configured to support a larger horizontal load while the arm is in a lowered position, and the arm/arm assembly may be configured to support a smaller horizontal load while the arm is in a raised position. Accordingly, the maximum horizontal load rating of the arm/arm assembly may be set to the smallest horizontal load the arm/arm assembly is configured to support. However, while the arm is in the lowered position, the maximum horizontal load rating of the arm/arm assembly may be significantly less than the horizontal load the arm/arm assembly is configured to support. Therefore, in certain embodiments disclosed herein, while a restricted-height implement, such as a dozer blade, is coupled to the arm, upward movement of the arm beyond the intermediate position is blocked, thereby enabling the maximum horizontal load rating of the arm/arm assembly to be increased while the restricted-height implement is coupled to the arm. As a result, a greater horizontal load may be applied to the restricted-height implement, as compared to a configuration in which the maximum horizontal load rating is set to the smallest horizontal load the arm/arm assembly is configured to support. Conversely, while an unrestricted-height implement, such as a bucket, is coupled to the arm, movement of the arm between the lowered position and the raised position may be enabled. As such, the maximum horizontal load rating may be reduced to the smallest horizontal load the arm/arm assembly is configured to support. Accordingly, the maximum height of the implement is selected based on the type of implement coupled to the arm, thereby enhancing the utility of the work vehicle.

As used herein "maximum horizontal load rating" refers to the maximum horizontal load the arm/arm assembly is configured to support throughout the enabled range of motion of the arm (e.g., corresponding to the minimum of the position-dependent horizontal loads the arm/arm assembly is configured to support throughout the enabled range of motion of the arm). The maximum horizontal load rating(s) of the arm/arm assembly may be published (e.g., for each type of implement), or the maximum horizontal load rating (s) may be unpublished. In addition, in certain embodiments, the maximum horizontal load rating of the arm/arm assembly (e.g., for the implement coupled to the arm) may be presented to the operator via the user interface.

Figure 2A:
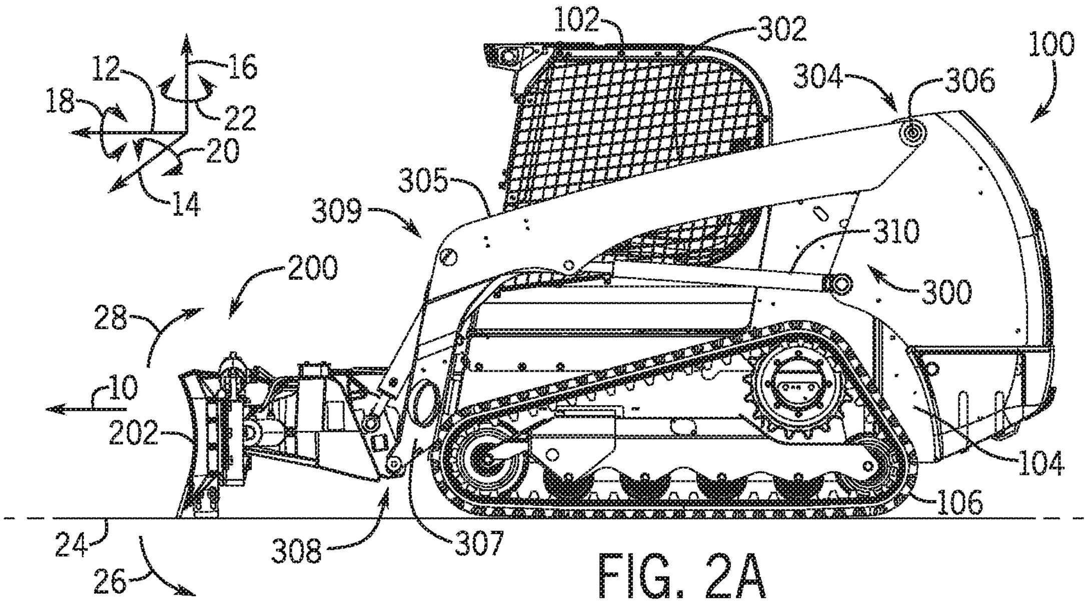
FIG. 2A is a side view of the work vehicle of FIG. 1, in which an arm of the arm assembly is in a lowered position.

FIG. 2A is a side view of the work vehicle 100 of FIG. 1, in which the arm 302 of the arm assembly 300 is in a lowered position. As illustrated, while the arm 302 is in the lowered position, the dozer blade 202 is in contact with the ground 24. Accordingly, in the illustrated embodiment, the lowered position of the arm 302 corresponds to the minimum height of the dozer blade 202 relative to the ground 24 along the vertical axis 16. However, in further embodiments, the lowered position of the arm may correspond to the position of the arm while the lift cylinder(s) are fully retracted, or the position of the arm while movement (e.g., rotation) of the arm in a downward direction 26 is otherwise blocked (e.g., via contact with the chassis, via contact with a stop, etc.). In certain embodiments, the arm 302 may be configured to support the greatest horizontal load while the arm 302 is in the illustrated lowered position. To increase the height of the arm 302 above the ground 24 along the vertical axis 16, the lift cylinder(s) 310 may be extended, thereby driving the arm 302 to rotate in an upward direction 28 about the pivot joints 306.

Figure 2B:
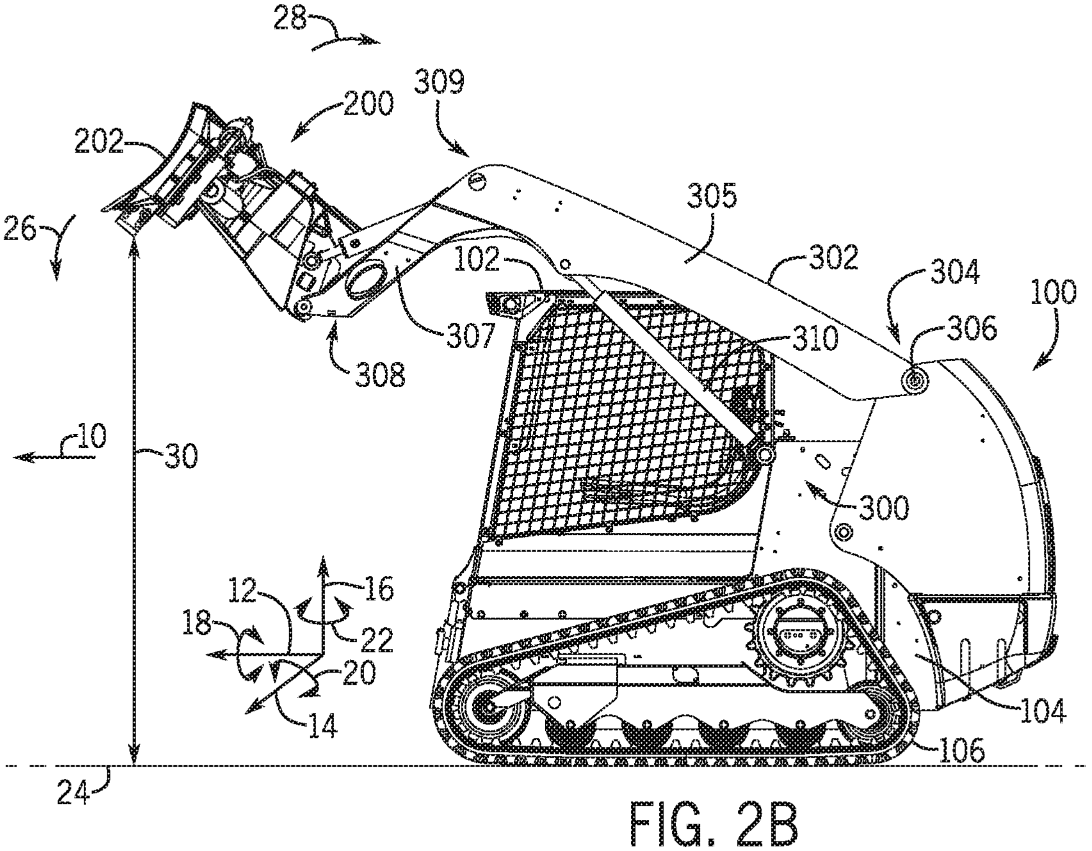
FIG. 2B is a side view of the work vehicle of FIG. 1, in which the arm of the arm assembly is in a raised position.

FIG. 2B is a side view of the work vehicle 100 of FIG. 1, in which the arm 302 of the arm assembly 300 is in a raised position. As illustrated, while the arm 302 is in the raised position, the dozer blade 202 is positioned at a maximum height 30 relative to the ground 24 along the vertical axis 16. In the illustrated embodiment, the raised position of the arm 302 corresponds to the position of the arm while the lift cylinder(s) 310 are fully extended. However, in further embodiments, the raised position of the arm may correspond to the position of the arm while movement (e.g., rotation) of the arm in the upward direction 28 is blocked (e.g., via contact with the chassis, via contact with a stop, etc.). In certain embodiments, the arm 302 may be configured to support the smallest horizontal load while the arm 302 is in the illustrated raised position. To lower the arm 302 relative to the ground 24 along the vertical axis 16, the lift cylinder (s) 310 may be retracted, thereby driving the arm 302 to rotate in the downward direction 26 about the pivot joints 306.

Figure 2C:
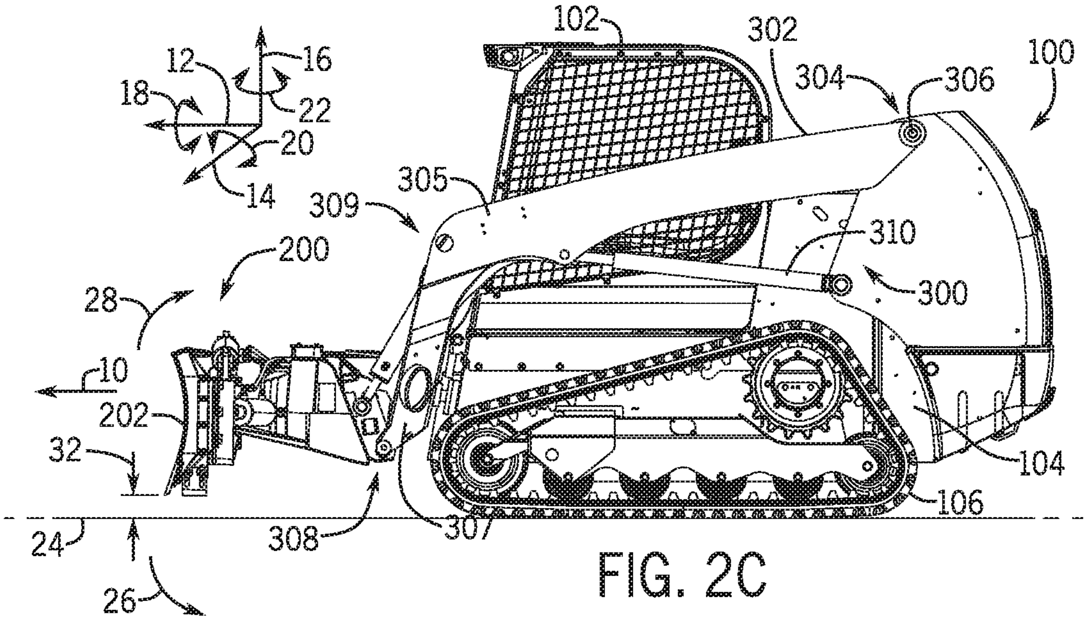
FIG. 2C is a side view of the work vehicle of FIG. 1, in which the arm of the arm assembly is in an intermediate position.

FIG. 2C is a side view of the work vehicle 100 of FIG. 1, in which the arm 302 of the arm assembly 300 is in an intermediate position. As illustrated, while the arm 302 is in the intermediate position, the dozer blade 202 is positioned at an intermediate height 32 relative to the ground 24 along the vertical axis 16. In certain embodiments, the work vehicle 100 includes an arm control system having a controller configured to receive a signal indicative of the type of implement coupled to the arm. In such embodiments, the controller is configured to enable movement of the arm 302 between the lowered position, as shown in FIG. 2A, and the raised position, as shown in FIG. 2B, while the implement is an unrestricted-height implement (e.g., a bucket, a grapple, etc.). In addition, the controller is configured to enable movement of the arm between the lowered position and the intermediate position and to block upward movement of the arm beyond the intermediate position (e.g., in the direction 28) while the type of implement is a restricted-height implement (e.g., the dozer blade 202). Blocking upward movement of the arm beyond the intermediate position may enable the maximum horizontal load rating of the arm/arm assembly to be increased while a restricted-height implement is coupled to the arm, thereby enhancing the utility of the work vehicle.

As used herein, "between" refers to a range of movement inclusive of the end positions. Accordingly, while movement of the arm between the lowered position and the raised position is enabled, the arm may be moved to the lowered position, to the raised position, and to positions between the lowered position and the raised position. In addition, while movement of the arm between the lowered position and the intermediate position is enabled, the arm may be moved to the lowered position, to the intermediate position, and to positions between the lowered position and the intermediate position.

In certain embodiments, the intermediate height 32 (e.g., the height of the dozer blade 202 above the ground 24 along the vertical axis 16 while the arm 302 is in the intermediate position) may be about 0 meters to about 2 meters, about 0.1 meters to about 1.5 meters, about 0.2 meters to about 1 meter, or about 0.3 meters above the height of the dozer blade 202 while the arm 302 is in the lowered position (e.g., in which the dozer blade 202 is in contact with the ground 24). In certain embodiments, the intermediate height of the restricted-height implement corresponds to a first height limit while the restricted-height implement is a first type of restricted-height implement (e.g., dozer blade), the intermediate height of the restricted-height implement corresponds to a second height limit while the restricted-height implement is a second type of restricted-height implement (e.g., ground-engaging tool), and the first height limit is above (e.g., along the vertical axis 16) the second height limit. By utilizing different height limits for different types of implements, the maximum horizontal load rating of the arm/arm assembly may be increased for each type of restricted-height implement, thereby enhancing the utility of the work vehicle. While two height limits are disclosed above, it should be appreciated that in alternative embodiments, the arm control system may be configured to establish 1, 2, 3, 4, 5, 6, or more height limits for various types of implements (e.g., based on the target maximum horizontal load ratings for the respective implements).

In certain embodiments, the intermediate position of the arm may correspond to the lowered position of the arm. Accordingly, the intermediate position of the arm may position the restricted-height implement at a minimum height relative to the ground along the vertical axis. In certain embodiments, the arm may contact the chassis of the work vehicle or a stop coupled to the chassis of the work vehicle while the arm is in the lowered position. As a result of the contact between the arm and the chassis/stop, a portion of the horizontal load applied to the arm by the restricted-height implement may be transferred to the chassis at the point of contact. Accordingly, while the intermediate position corresponds to the lowered position, the maximum horizontal load rating of the arm/arm assembly may be further increased, as compared to a configuration in which the arm is separated from the chassis/stop, and the horizontal load is transferred from the arm to the chassis only at the arm pivot joints, and in certain embodiments, the lift cylinders.

While the arm 302 is configured to rotate about the pivot joints 306 between the lowered position and the raised position in the illustrated embodiment, it should be appreciated that in alternative embodiments, the arm may be configured to translate substantially along the vertical axis between the lowered position and the raised position. For example, in certain embodiments, the arm may be an element of a linkage (e.g., a four-bar linkage, a parallel linkage, etc.). The linkage may be configured to translate the arm and the implement (e.g., dozer blade), which is coupled to the arm, substantially along the vertical axis (e.g., in response to extension and retraction of lift cylinder(s) coupled to the linkage).

Figure 3:
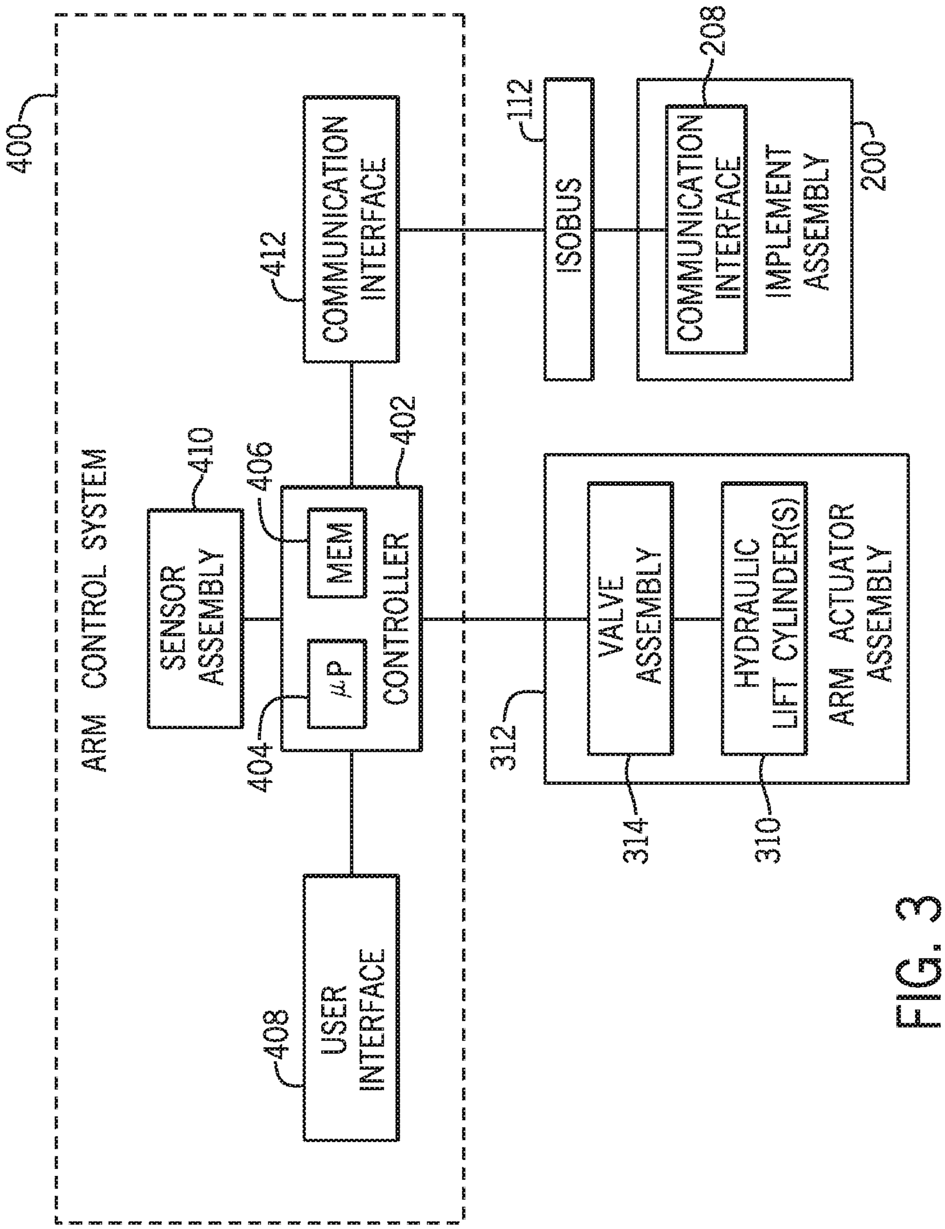
FIG. 3 is a schematic diagram of an embodiment of an arm control system that may be employed to control the arm assembly of FIG. 1.

FIG. 3 is a schematic diagram of an embodiment of an arm control system 400 that may be employed to control the arm assembly of FIG. 1. In the illustrated embodiment, the arm control system 400 includes a controller 402 configured to receive a signal indicative of a type of implement coupled to the arm of the work vehicle. The controller 402 is also configured to enable movement of the arm between the lowered position and the raised position while the type of implement is an unrestricted-height implement. In addition, the controller 402 is configured to enable movement of the arm between the lowered position and the intermediate position and to block upward movement of the arm beyond the intermediate position while the type of implement is a restricted-height implement. As discussed in detail below, the controller 402 is configured to output a signal (e.g., second signal) to an actuator assembly 312, which includes the hydraulic lift cylinder(s) 310 in the illustrated embodiment, to control movement of the arm.

In certain embodiments, the controller 402 is an electronic controller having electrical circuitry configured to process data associated with control of the arm actuator assembly 312. In the illustrated embodiment, the controller 402 include a processor, such as the illustrated microprocessor 404, and a memory device 406. The controller 402 may also include one or more storage devices and/or other suitable components. The processor 404 may be used to execute software, such as software for controlling the arm actuator assembly 312, and so forth. Moreover, the processor 404 may include multiple microprocessors, one or more "general-purpose" microprocessors, one or more special-purpose microprocessors, and/or one or more application specific integrated circuits (ASICS), or some combination thereof. For example, the processor 404 may include one or more reduced instruction set (RISC) processors.

The memory device 406 may include a volatile memory, such as random access memory (RAM), and/or a nonvolatile memory, such as read-only memory (ROM). The memory device 406 may store a variety of information and may be used for various purposes. For example, the memory device 406 may store processor-executable instructions (e.g., firmware or software) for the processor 404 to execute, such as instructions for controlling the arm actuator assembly 312, and so forth. The storage device(s) (e.g., nonvolatile storage) may include ROM, flash memory, a hard drive, or any other suitable optical, magnetic, or solid-state storage medium, or a combination thereof. The storage device(s) (e.g., having non-transitory, tangible, machine-readable medium/media) may store data, instructions (e.g., software or firmware for controlling the arm actuator assembly 312, etc.), and any other suitable data.

The controller 402 is configured to instruct the arm actuator assembly 312 to move the arm of the work vehicle (e.g., in response to operator input). For example, in the illustrated embodiment, the arm control system 400 includes a user interface 408 communicatively coupled to the controller 402. The user interface 408 may include a display (e.g., a touch screen display), controls, other input devices and/or output devices, or a combination thereof. For example, the operator may operate controls of the user interface 408 to control the position of the arm.

As previously discussed, the controller 402 is configured to receive a signal indicative of the type of implement coupled to the arm of the work vehicle (e.g., a restricted-height implement or an unrestricted-height implement). The signal indicative of the type of implement may be received from the user interface 408. For example, the operator may input the type of implement coupled to the arm into the user interface (e.g., via a touch screen display), and the user interface 408, in turn, may output a signal indicative of the type of implement to the controller 402. In certain embodiments, the operator may input whether the implement is a restricted-height implement or an unrestricted-height implement, and the user interface may output a signal indicating that the implement coupled to the arm is a restricted-height implement or an unrestricted-height implement. In addition or alternatively, the operator may input a specific type of implement (e.g., a dozer blade, a bucket, a grapple, etc.) into the user interface, and the user interface may output a signal indicative of the specific type of implement. The controller may then determine whether the specific type of implement is a restricted-height implement or an unrestricted-height implement (e.g., based on a look-up table stored within the memory 406).

In certain embodiments, the arm control system 400 includes a sensor assembly 410 communicatively coupled to the controller 402. The sensor assembly 410 may include an implement identification sensor configured to output the signal indicative of the type of implement coupled to the arm. For example, in certain embodiments, the implement identification sensor may include a scanner (e.g., barcode scanner, optical scanner, etc.) configured to read a code (e.g., barcode, numerical code, etc.) on the implement and to output a signal to the controller 402 indicative of the code. The controller 402, in turn, may determine the type of implement coupled to the arm based on the code (e.g., via a look-up table stored within the memory 406). In further embodiments, the implement identification sensor may include any other suitable type of sensor (e.g., RFID reader, optical sensor, magnetic sensor, etc.) configured to output a signal indicative of the type of implement coupled to the arm (e.g., based on feedback from an RFID tag, based on the shape and/or size of the implement, based on presence/absence of a magnetic tag on the implement, etc.).

In addition, the sensor assembly 410 may include an arm position sensor configured to output a signal to the controller 402 indicative of the position of the arm. For example, the arm position sensor may include a linear variable differential transformer (LVDT), a potentiometer, an infrared sensor, an ultrasonic sensor, or any other suitable sensor configured to output a signal indicative of the position of the arm. In certain embodiments, the arm position sensor may be integrated within a hydraulic lift cylinder. The controller 402 may be configured to determine whether the arm is in the lowered position, the raised position, or the intermediate position based on the signal from the arm position sensor.

In certain embodiments, the arm control system 400 includes a communication interface 412 communicatively coupled to the controller 402 and configured to output the signal indicative of the type of implement coupled to the arm. In the illustrated embodiment, the arm control system communication interface 412 is communicatively coupled to an implement assembly communication interface 208 via an ISOBUS network 112. The communication interface 208 of the implement assembly 200 is configured to output a signal indicative of the type of implement (e.g., based on data stored within a memory device of the implement assembly). The ISOBUS network 112 is configured to convey the signal from the implement assembly communication interface 208 to the arm control system communication interface 412, and the arm control system communication interface is configured to output the signal to the controller 402. While the communication interfaces are communicatively coupled to one another via an ISOBUS network in the illustrated embodiment, it should be appreciated that the communication interfaces may be communicatively coupled to one another by any other suitable communication system in alternative embodiments (e.g., CAN bus, Ethernet, Wi-Fi, Bluetooth, etc.). While the illustrated arm control system 400 includes a user interface 408, a sensor assembly 410, and a communication interface 412, it should be appreciated that in alternative embodiments, at least one of the user interface, the sensor assembly, and the communication interface may be omitted. Furthermore, in certain embodiments, the controller may be configured to receive the signal indicative of the type of implement coupled to the arm from another suitable system/device (e.g., a card reader, etc.).

The controller 402 is configured to control movement of the arm by outputting a signal (e.g., a second signal) to the actuator assembly 312. In the illustrated embodiment, the arm actuator assembly 312 includes the hydraulic lift cylinder(s) 310, which are configured to move the arm of the work vehicle, and a valve assembly 314 fluidly coupled to the hydraulic lift cylinder(s) 310. The valve assembly 314 is configured to control fluid flow (e.g., from a hydraulic source) to the hydraulic lift cylinder(s) 310. In the illustrated embodiment, the controller 402 is configured to output a signal to the valve assembly indicative of instructions to move the arm or to block movement of the arm. For example, to raise the arm, the controller 402 may instruct the valve assembly 314 to enable fluid flow to a cap end of each hydraulic lift cylinder. And, to lower the arm, the controller 402 may instruct the valve assembly 314 to enable fluid flow to a rod end of each hydraulic lift cylinder. In addition, to block movement of the arm, the controller 402 may instruct the valve assembly 314 to block fluid flow to and from the hydraulic lift cylinder(s) 310.

By way of example, an unrestricted-height implement may be coupled to the arm. Accordingly, the controller may be configured to enable movement of the arm between the lowered position and the raised position. As a result, if the controller receives a signal (e.g., from the user interface) indicative of instructions to raise the arm, the controller may output a signal to the valve assembly indicative of instructions to enable fluid flow to the cap end of each hydraulic lift cylinder. However, when the arm reaches the raised position, the controller may output a signal to the valve assembly indicative of instructions to block fluid flow to and from the hydraulic lift cylinder(s). Furthermore, if the controller receives a signal (e.g., from the user interface) indicative of instructions to lower the arm, the controller may output a signal to the valve assembly indicative of instructions to enable fluid flow to the rod end of each hydraulic lift cylinder. However, when the arm reaches the lowered position, the controller may output a signal to the valve assembly indicative of instructions to block fluid flow to and from the hydraulic lift cylinder(s).

In addition, a restricted-height implement may be coupled to the arm. Accordingly, the controller may be configured to enable movement of the arm between the lowered position and the intermediate position and to block upward movement of the arm beyond the intermediate position. As a result, if the controller receives a signal (e.g., from the user interface) indicative of instructions to raise the arm, the controller may output a signal to the valve assembly indicative of instructions to enable fluid flow to the cap end of each hydraulic lift cylinder. However, when the arm reaches the intermediate position, the controller may output a signal to the valve assembly indicative of instructions to block fluid flow to and from the hydraulic lift cylinder(s). Furthermore, if the controller receives a signal (e.g., from the user interface) indicative of instructions to lower the arm, the controller may output a signal to the valve assembly indicative of instructions to enable fluid flow to the rod end of each hydraulic lift cylinder. However, when the arm reaches the lowered position, the controller may output a signal to the valve assembly indicative of instructions to block fluid flow to and from the hydraulic lift cylinder(s). While the arm actuator assembly includes hydraulic lift cylinder(s) and a valve assembly in the illustrated embodiment, it should be appreciated that in alternative embodiments, the arm actuator assembly may include a pneumatic actuator system, an electromechanical actuator system, any other suitable type of actuator system, or a combination thereof.

In certain embodiments, the user interface 408 is configured to inform the operator when the arm has reached the lowered position, the raised position, and the intermediate position. For example, if the operator instructs the arm to move downwardly, the controller may output a signal to the user interface when the arm reaches the lowered position. The user interface, in turn, may provide a visual and/or audible indication that the arm has reached the lowered position. In addition, if an unrestricted-height implement is coupled to the arm and the operator instructs the arm to move upwardly, the controller may output a signal to the user interface when the arm reaches the raised position. The user interface, in turn, may provide a visual and/or audible indication that the arm has reached the raised position. Furthermore, if a restricted-height implement is coupled to the arm and the operator instructs the arm to move upwardly, the controller may output a signal to the user interface when the arm reaches the intermediate position. The user interface, in turn, may provide a visual and/or audible indication that the arm has reached the intermediate position.

Figure 4:
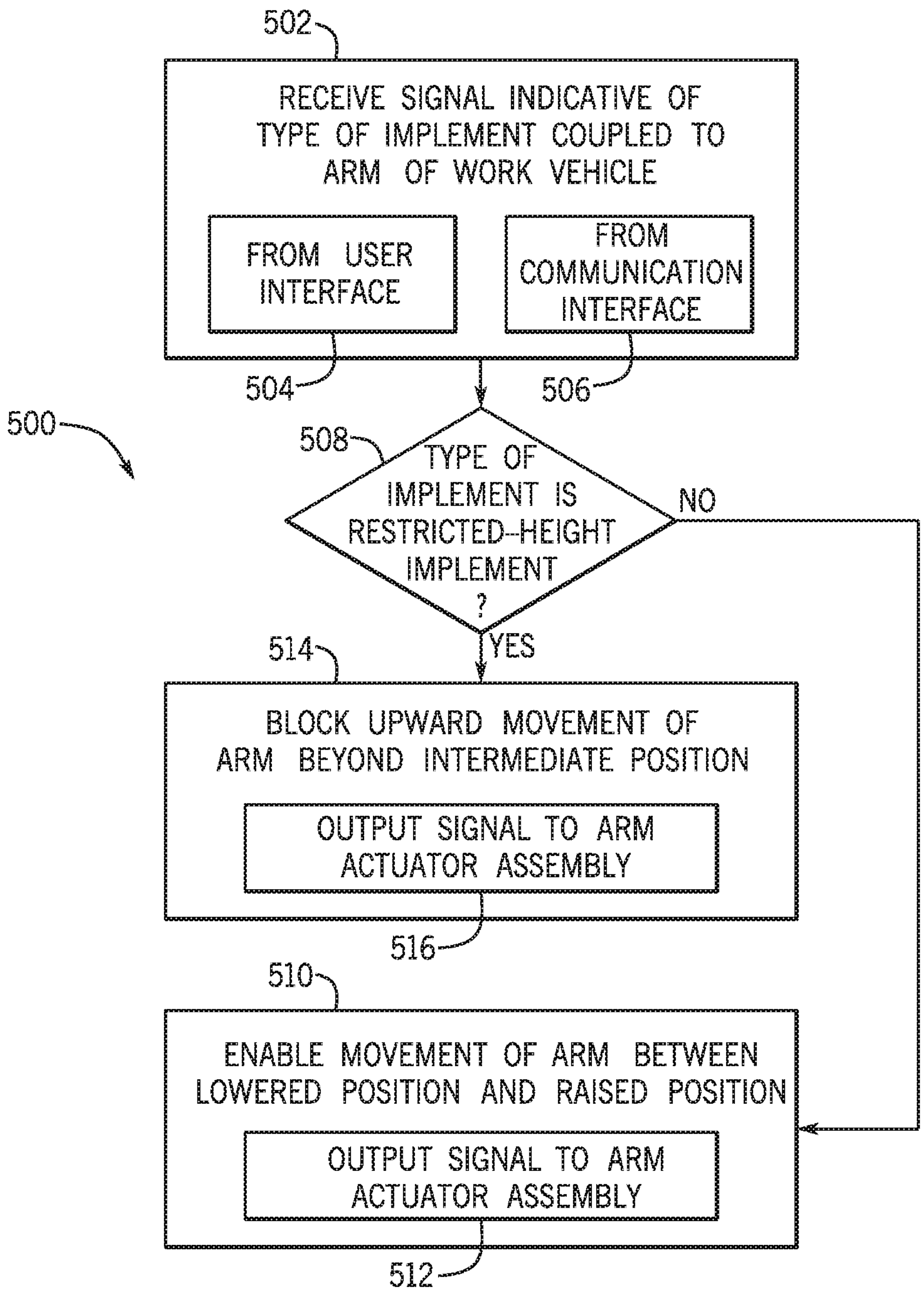
FIG. 4 is a flow diagram of an embodiment of a method for controlling an arm of a work vehicle.

FIG. 4 is a flow diagram of an embodiment of a method 500 for controlling an arm of a work vehicle. First, as represented by block 502, a signal indicative of a type of implement coupled to the arm of the work vehicle is received. As previously discussed, the signal indicative of the type of implement may be received from a user interface, as represented by block 504, or the signal indicative of the type of implement may be received from a communication interface, as represented by block 506. Next, as represented by block 508, a determination is made regarding whether the type of implement is a restricted-height implement. If the implement is not a restricted-height implement (e.g., the implement is an unrestricted-height implement), movement of the arm between the lowered position and the raised position is enabled, as represented by block 510. For example, a signal indicative of instructions to control the arm may be output to the arm actuator assembly, as represented by block 512.

If the implement is a restricted-height implement, movement of the arm between the lowered position and the intermediate position is enabled, and upward movement of the arm beyond the intermediate position is blocked, as represented by block 514. For example, a signal indicative of instructions to control the arm may be output to the arm actuator assembly, as represented by block 516. In certain embodiments, the intermediate height of the restricted-height implement corresponds to a first height limit while the restricted-height implement is a first type of restricted-height implement (e.g., dozer blade), the intermediate height of the restricted-height implement corresponds to a second height limit while the restricted-height implement is a second type of restricted-height implement (e.g., ground-engaging tool), and the first height limit is above the second height limit. Blocking movement of the arm above the intermediate position may enable the maximum horizontal load rating of the arm/arm assembly to be increased while a restricted-height implement is coupled to the arm, thereby enhancing the utility of the work vehicle.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An arm control system for a work vehicle, comprising:
a controller comprising a memory and a processor, wherein the controller is configured to:
receive a signal indicative of a type of implement coupled to an arm of the work vehicle;
enable movement of the arm between a lowered position and a raised position while the type of implement is an unrestricted-height implement; and
enable movement of the arm between the lowered position and an intermediate position and block upward movement of the arm beyond the intermediate position while the type of implement is a restricted-height implement;
wherein the arm is configured to position the unrestricted-height implement at a first height while the arm is in the raised position, the arm is configured to position the restricted-height implement at a second height while the arm is in the intermediate position, and the second height is below the first height.

2. The arm control system of claim 1, wherein the second height corresponds to a first height limit while the restricted-height implement is a first type of restricted-height implement, the second height corresponds to a second height limit while the restricted-height implement is a second type of restricted-height implement, and the first height limit is above the second height limit.

3. The arm control system of claim 1, wherein the controller is configured to output a second signal to an arm actuator assembly to control movement of the arm.

4. The arm control system of claim 3, wherein the arm actuator assembly comprises a lift actuator configured to couple to the arm and to a chassis of the work vehicle.

5. The arm control system of claim 4, wherein the lift actuator comprises a hydraulic lift cylinder, the arm actuator assembly comprises a valve assembly communicatively coupled to the controller and fluidly coupled to the hydraulic lift cylinder, and the valve assembly is configured to control fluid flow to and from the hydraulic lift cylinder based on the second signal.

6. The arm control system of claim 1, comprising a user interface communicatively coupled to the controller, wherein the user interface is configured to output the signal indicative of the type of implement.

7. The arm control system of claim 1, comprising a communication interface communicatively coupled to the controller, wherein the communication interface is configured to output the signal indicative of the type of implement.

8. The arm control system of claim 1, wherein the restricted-height implement comprises a dozer blade.

9. The arm control system of claim 1, wherein the arm is configured to position the restricted-height implement at a third height while the arm is in the lowered position, and the second height is about 0.3 meters above the third height.

10. A method for controlling an arm of a work vehicle, comprising:
receiving, via a controller, a signal indicative of a type of implement coupled to the arm of the work vehicle;
enabling, via the controller, movement of the arm between a lowered position and a raised position while the type of implement is an unrestricted-height implement; and
enabling, via the controller, movement of the arm between the lowered position and an intermediate position while the type of implement is a restricted-height implement, and blocking, via the controller, upward movement of the arm beyond the intermediate position while the type of implement is the restricted-height implement;
wherein the arm is configured to position the unrestricted-height implement at a first height while the arm is in the raised position, the arm is configured to position the restricted-height implement at a second height while the arm is in the intermediate position, and the second height is below the first height.

11. The method of claim 10, wherein the second height corresponds to a first height limit while the restricted-height implement is a first type of restricted-height implement, the second height corresponds to a second height limit while the restricted-height implement is a second type of restricted-height implement, and the first height limit is above the second height limit.

12. The method of claim 10, wherein enabling and blocking movement of the arm comprises outputting, via the controller, a second signal to an arm actuator assembly.

13. The method of claim 10, wherein the signal indicative of the type of implement is received from a user interface.

14. The method of claim 10, wherein the signal indicative of the type of implement is received from a communication interface.

15. An apparatus comprising:
at least one non-transitory, tangible, machine-readable medium having instructions encoded thereon for execution by a processor, the instructions comprising:
instructions to receive a signal indicative of a type of implement coupled to an arm of a work vehicle;
instructions to enable movement of the arm between a lowered position and a raised position while the type of implement is an unrestricted-height implement; and
instructions to enable movement of the arm between the lowered position and an intermediate position and to block upward movement of the arm beyond the intermediate position while the type of implement is a restricted-height implement;

wherein the arm is configured to position the unrestricted-height implement at a first height while the arm is in the raised position, the arm is configured to position the restricted-height implement at a second height while the arm is in the intermediate position, and the second height is below the first height.

16. The apparatus of claim 15, wherein the second height corresponds to a first height limit while the restricted-height implement is a first type of restricted-height implement, the second height corresponds to a second height limit while the restricted-height implement is a second type of restricted-height implement, and the first height limit is above the second height limit.

17. The apparatus of claim 15, wherein the instructions to enable movement of the arm and to block movement of the arm comprise instructions to output a second signal to an arm actuator assembly.

18. The apparatus of claim 15, wherein the instructions to receive the signal indicative of the type of implement comprise instructions to receive the signal from a user interface.

19. The apparatus of claim 15, wherein the instructions to receive the signal indicative of the type of implement comprise instructions to receive the signal from a communication interface.

20. The apparatus of claim 15, wherein the restricted-height implement comprises a dozer blade.

* * * * *